March 14, 1950     A. J. PENN     2,500,860
INTERNAL-COMBUSTION ENGINE POWER PLANT
Original Filed Sept. 24, 1946     3 Sheets—Sheet 1
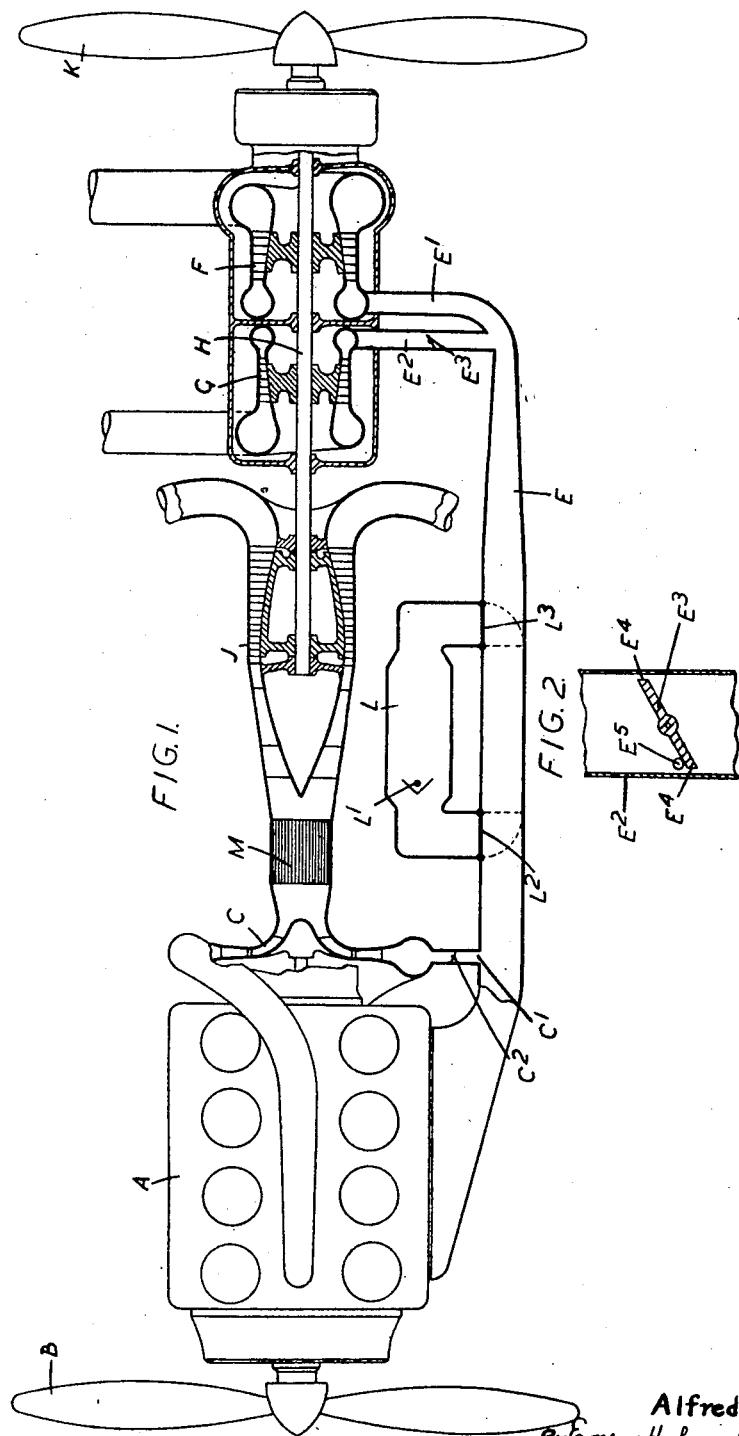
Inventor
Alfred J. Penn
By Emery, Holcombe & Blair
Attorney

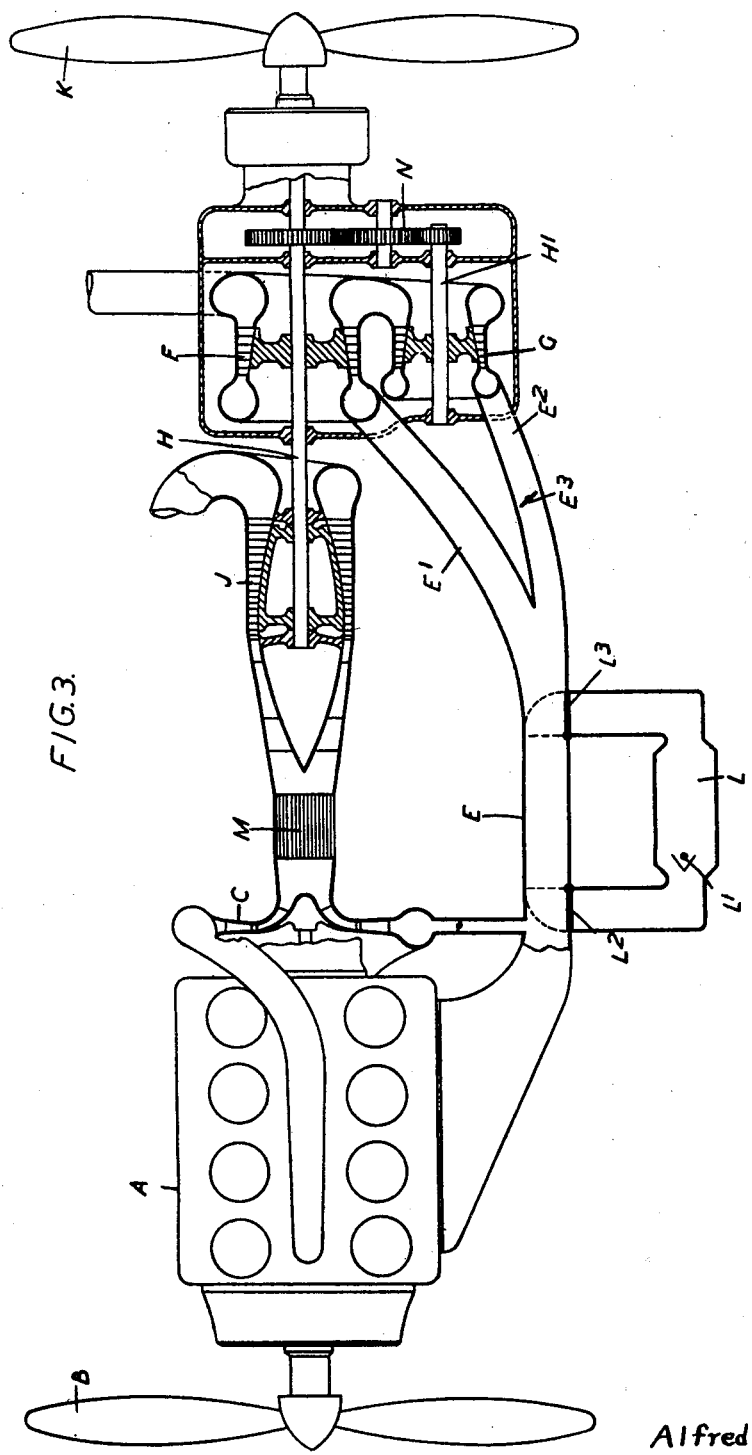

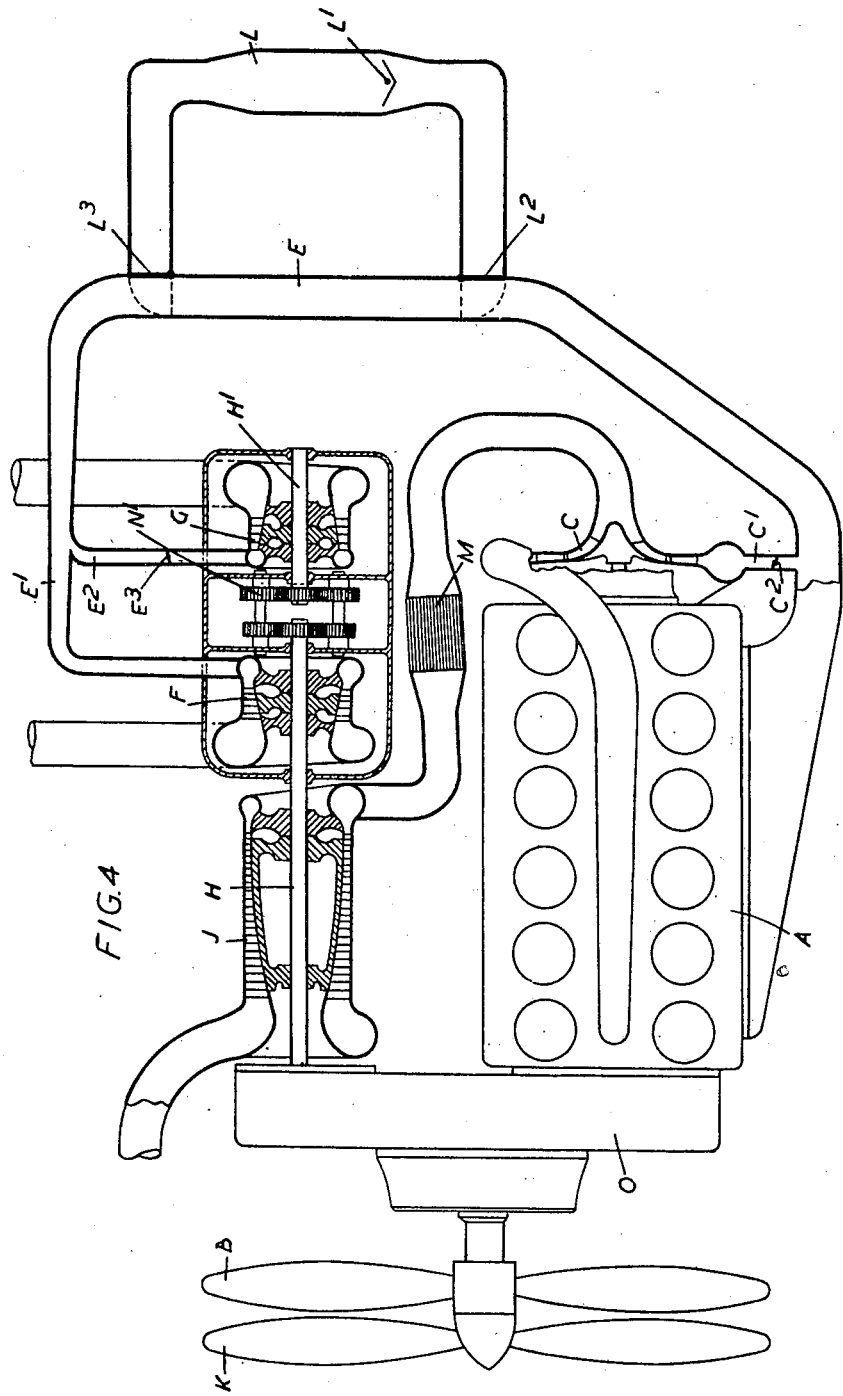

Patented Mar. 14, 1950

2,500,860

UNITED STATES PATENT OFFICE 2,500,860

INTERNAL-COMBUSTION ENGINE POWER PLANT

Alfred John Penn, Pinner, England, assignor to D. Napier & Son Limited, London, England, a company of Great Britain Original application September 24, 1946, Serial No. 698,902. Divided and this application February 18, 1948, Serial No. 9,263. In Great Britain July 20, 1944

Section 1, Public Law 690, August 8, 1946
Patent expires July 20, 1964

5 Claims. (Cl. 170—135.25)

This invention relates to an internal combustion engine power plant of the type which includes at least one turbine driven by the exhaust gases from the engine and has for its object to effect certain improvements in the arrangement and operation of such turbines. This application is a division of application Serial No. 698,902, filed September 24, 1946, by applicant jointly with Benjamin William Barlow and Herbert Sammons.

According to this invention the improved power plant comprises in combination an internal combustion engine operating on the two-stroke cycle and arranged to utilize air in the charge considerably in excess of that required for combustion and driving on the one hand a propeller and on the other hand a compressor which supplies air to the engine, a turbine comprising two parts each constituted by a separate turbine structure, namely a main part and a subsidiary or second part, both parts being adapted to be driven in parallel by exhaust gases from the engine, an axial flow compressor and a propeller both driven by the main turbine part, means by which this compressor and propeller can also be driven by the second turbine part, and means for controlling the flow of exhaust gases to the second turbine part so that at normal loads only sufficient gases act thereon to overcome inertia, friction and the like effects in that turbine part, but at starting or at full load on the plant the second turbine part will be caused to develop power to supplement that derived from the main turbine part.

Since the engine operates on the two-stroke cycle the airflow through it is considerably greater than in a four-stroke cycle engine, particularly a spark ignition engine in which the amount of air consumed is further limited by the necessity for having a favourable mixture strength. The increased quantity of air flowing through the engine has several advantages. In the first place the cooling of the engine is improved. Another advantage is that the mass of the gases flowing to the turbine, and hence the turbine output, is increased without having to mix fresh air with these gases and so reduce their temperature. This additional mass flow enables the turbine to produce an output sufficient to drive the said axial flow compressor and a propeller as well. Moreover, the excess air enables additional fuel to be burnt in the gases passing from the engine to the turbine to increase their temperature further.

The two turbine parts may be mounted on separate coaxial shafts or on the same shaft. Alternatively they may be mounted side by side with their shafts parallel and with the second turbine part arranged to drive through gearing the shaft through which the main turbine part drives the compressor and propeller.

In addition to driving the axial flow compressor the main turbine part may drive the propeller tthrough gearing and this propeller may be mounted coaxially with the engine driven propeller, and through gearing the second turbine part may drive the shaft of the main turbine part and thereby co-operate in driving the axial flow compressor and the second propeller, the shafts of the two parts of the turbine being separate but coaxial.

There may be a chamber wherein fuel is burnt and by suitable means the gases flowing from the engine to the turbine parts may be diverted on their way so that they will pass through this chamber. In the passage through which the gases from the engine pass to the second turbine part there is a valve which is so constructed and arranged that it cannot fully close this gas passage, but must at least allow the flow of a sufficient quantity of the gases to maintain rotation of the second turbine part by overcoming inertia, friction and like effects in that turbine part. The air delivered by the turbine-driven axial flow compressor passes to the compressor, which is a centrifugal compressor, driven by the engine and thus this centrifugal compressor functions in effect as a stage of the axial flow compressor in supplying air for supercharging the engine. Preferably there is an intercooler between these two compressors.

The accompanying drawings illustrate diagrammatically and by way of example alternative arrangements for the improved power plant. In these drawings Figure 1 is a longitudinal sectional plan of one construction in which the two parts of the turbine are mounted on the same shaft.

Figure 2 is a section on an enlarged scale of the valve in the passage through which the exhaust gases flow to the second part of the turbine.

Figure 3 is a view similar to Figure 1 but showing an arrangement in which the two parts of the turbine are disposed side by side with their shafts parallel.

Figure 4 is again a similar view but illustrating a construction in which the turbine parts are arranged differently and drive a second propeller mounted coaxially with the propeller which is driven by the engine.

Referring to Figure 1, the internal combustion engine A drives from one end of its crank shaft a propeller B and this shaft also drives a centrifugal compressor C the air from which is delivered to the engine. The exhaust gases from the engine A flow through a main passage E and two secondary passages $E^1$ and $E^2$ to the two parts of the turbine, namely the main part F and the subsidiary or second part G. These two turbine parts are here mounted on a common shaft H which at one end is connected to and drives an axial flow compressor J while from the other end of this shaft is driven a propeller K. In the branch passage $E^2$ leading to the second turbine part G is a throttle valve $E^3$, shown on a larger scale in Figure 2, which is provided with a limiting stop, such as $E^5$ as is well known in the art, so that it cannot fully close the passage $E^2$ and stop all gas flow. When it is closed as far as permitted, as shown in the drawing, there is left a clearance $E^4$ through which can pass such a quantity of gas as will serve to overcome the inertia of the turbine part G and friction and like effects therein and thus while this turbine continues to rotate, no appreciable torque is transmitted from it. If, however, the valve $E^3$ is opened to allow more gas to flow, the turbine part G will materially assist the main turbine part F in the driving of the compressor J and the propeller K.

It is convenient to provide a chamber L in which fuel can be burnt as at $L^1$, and by means of valves $L^2$ and $L^3$ the exhaust gases flowing through the passage E can be diverted and caused to pass through the chamber L as they flow to the turbine parts F and G. When the gas flow is thus diverted and to assist in the combustion of the fuel in the chamber L it is preferable to bleed off some air from the compressor C, for instance through the passage $C^1$ in which is a valve $C^2$, this air entering the main gas passage E at a place before the diversion of the gases occurs at the valve $L^2$.

It is an advantage to provide an intercooler M between the two compressors so that the air delivered by the axial flow compressor J will be cooled as it passes to the centrifugal compressor C which delivers all the air to the engine.

The construction shown in Figure 3 differs from that above described and shown in Figure 1 in the arrangement of the two turbine parts F and G which here are mounted not on the same shaft but side by side with the shaft $H^1$ of the turbine part G parallel to the main shaft H which is driven by the main turbine part F which through this shaft drives the compressor J and the propeller K. This shaft H can also be driven by the second turbine part G through gearing N when additional power is required, as at starting or at full load.

In the further alternative arrangement shown in Figure 4 the propeller B is driven from the engine A through gearing contained in the casing O and the second propeller K is mounted coaxially with the propeller B and is driven by the turbine parts F and G through gearing enclosed in the casing O. The turbine part F and G are arranged with their separate shafts H and $H^1$ coaxial and parallel with the axis of the crankshaft of the engine A, and power from the second turbine part G is transmitted through gearing $N^1$ to the shaft H of the main turbine part F. The other features shown in this figure are as already described with reference to Figure 1.

An improved power plant as described with reference to Figure 1 or Figure 3 is adapted for mounting in the wing of an aircraft for example either with the engine driven propeller B operating as a tractor and the propeller K driven by the turbine operating as a pusher, or the propeller K operating as a tractor and the propeller B as a pusher.

It will be understood that when the flow of exhaust gases from the engine to the second turbine part G is reduced by the partial closing of the passage $E^2$ by the valve $E^3$ the whole body of the gases in the passage E, except for the small portion permitted still to act on the turbine part G, will go to the main turbine part F and exert full power therein. If desired the speed of the main turbine part F may be controlled by providing a by-pass passage with valve therein which will enable some portion of the gases going to this turbine part to be allowed to pass to the atmosphere or to be otherwise used. Preferably, however, the speed of the main turbine part is controlled by adjustment of the blades of the propeller K which is of the variable pitch type.

The construction of the two parts F and G of the turbine may be similar or they may differ as may be desirable. It is to be noted, however, that the second turbine part G does not in any way function as a second stage with respect to the main turbine part F, but as shown in the drawings the gases go from the engine to the second turbine part G direct, unless diverted through the chamber L, and at the same pressure as the gases going to the main turbine part F.

What I claim as my invention and desire to secure by Letters Patent is:

1. A power plant comprising in combination an internal combustion engine operating on the two-stroke cycle and arranged to utilize air in the charge considerably in excess of that required for combustion, a propeller driven by the said engine, a centrifugal compressor constantly supplying air directly to the said engine by which it is driven, a turbine comprising two separately constructed parts adapted to be driven in parallel by the gases produced in the said engine, a valve for controlling the flow of gases to one part of the said turbine, means associated with said valve to ensure that this flow cannot be wholly cut off so that there will be at least a sufficient quantity of the gases acting on the said part of the turbine to overcome inertia, friction and like effects on that turbine part, an axial flow compressor which is driven by at least one of the parts of the said turbine and while the turbine is operative constantly delivers supercharging air for the engine to the said centrifugal compressor, and a second propeller driven by said turbine.

2. A power plant comprising in combination an internal combustion engine operating on the two-stroke cycle and arranged to utilize air in the charge considerably in excess of that required for combustion, a propeller driven by the said engine, a centrifugal compressor constantly supplying air directly to the said engine by which it is driven, a turbine comprising two separately constructed parts mounted on and driving the same shaft and adapted to be driven in parallel by the gases produced in the said engine, an axial flow compressor the shaft of which is coaxial with, connected to and driven from the shaft which carries the said two-part turbine, this compressor while the turbine is operative constantly delivering supercharging air for the engine to the said centrifugal compressor, and a second propeller driven by the said turbine.

3. A power plant for airplanes comprising in combination an internal combustion engine operating on the two-stroke cycle, a centrifugal compressor driven by said engine and constantly supplying air thereto, a turbine comprising two separate blade carrying parts arranged for operation in parallel by exhaust gases from said engine, means for bleeding air from said centrifugal compressor to the exhaust gases from said engine before entering said turbine, an axial flow compressor driven by said turbine and constantly delivering supercharging air to said centrifugal compressor, means for diverting exhaust gases from one of said turbine blade carrying parts to the other of said blade carrying parts, and two propellers of comparable size driven by said power plant, one of said propellers being geared to said engine and the other of said propellers being geared to said turbine.

4. A power plant for airplanes comprising in combination an internal combustion engine operating on the two-stroke cycle, a centrifugal compressor driven by said engine and constantly supplying air thereto, a turbine comprising two separate blade carrying parts arranged for operation in parallel by exhaust gases from said engine, means for heating said exhaust gases before entering said turbine and constantly delivering supercharging air to said centrifugal compressor, means for diverting exhaust gases from one of said turbine blade carrying parts to the other of said blade carrying parts and two propellers of comparable size driven by said power plant, one of said propellers being geared to said engine and the other of said propellers being geared to said turbine.

5. A power plant for airplanes comprising in combination an internal combustion engine operating on the two-stroke cycle, a centrifugal compressor driven by said engine and constantly supplying air thereto, a turbine comprising two separate blade carrying parts arranged for operation in parallel by exhaust gases from said engine, means for bleeding air from said centrifugal compressor to the exhaust gases from said engine and for adding fuel thereto before entering said turbine, an axial flow compressor driven by said turbine and constantly delivering supercharging air to said centrifugal compressor, means for diverting exhaust gases from one of said turbine blade carrying parts to the other of said blade carrying parts, and two propellers of comparable size driven by said power plant, one of said propellers being geared to said engine and the other of said propellers being geared to said turbine.

ALFRED JOHN PENN.

REFERENCES CITED

The following references are of record in the file of this patent:

UNITED STATES PATENTS

| Number | Name | Date |
| --- | --- | --- |
| 1,279,128 | Lake | Sept. 17, 1918 |
| 2,385,366 | Lysholm | Sept. 25, 1945 |
| 2,411,227 | Planiol et al. | Nov. 19, 1946 |
| 2,421,518 | Molloy | June 3, 1947 |
| 2,427,846 | Forsyth | Sept. 23, 1947 |
| 2,443,717 | Birmann | June 22, 1948 |

FOREIGN PATENTS

| Number | Country | Date |
| --- | --- | --- |
| 479,822 | Great Britain | Feb. 11, 1938 |
| 877,590 | France | Sept. 7, 1942 |

OTHER REFERENCES

C. F. Bachle, "Turbine Compounding with the Piston Engine," S. A. E. Journal, June 1945.